Sept. 26, 1933.  G. J. WIGGENHORN  1,928,344
WATER COOLER AND DISPENSER
Filed Oct. 14, 1931  3 Sheets-Sheet 1

Sept. 26, 1933. G. J. WIGGENHORN 1,928,344
WATER COOLER AND DISPENSER
Filed Oct. 14, 1931 3 Sheets-Sheet 2

INVENTOR
G. J. WIGGENHORN
BY Hazard and Miller
ATTORNEYS

Sept. 26, 1933.   G. J. WIGGENHORN   1,928,344
WATER COOLER AND DISPENSER
Filed Oct. 14, 1931    3 Sheets-Sheet 3
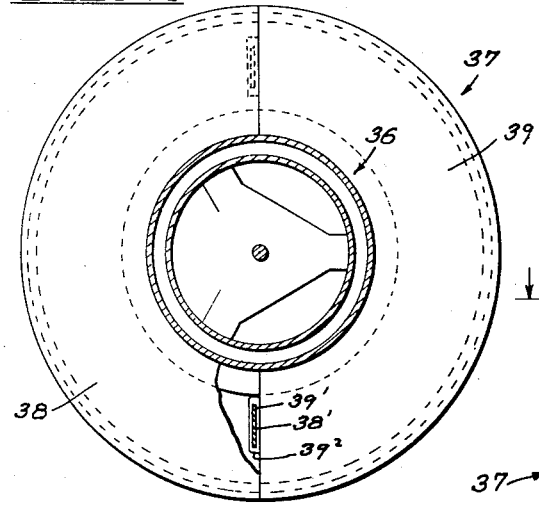
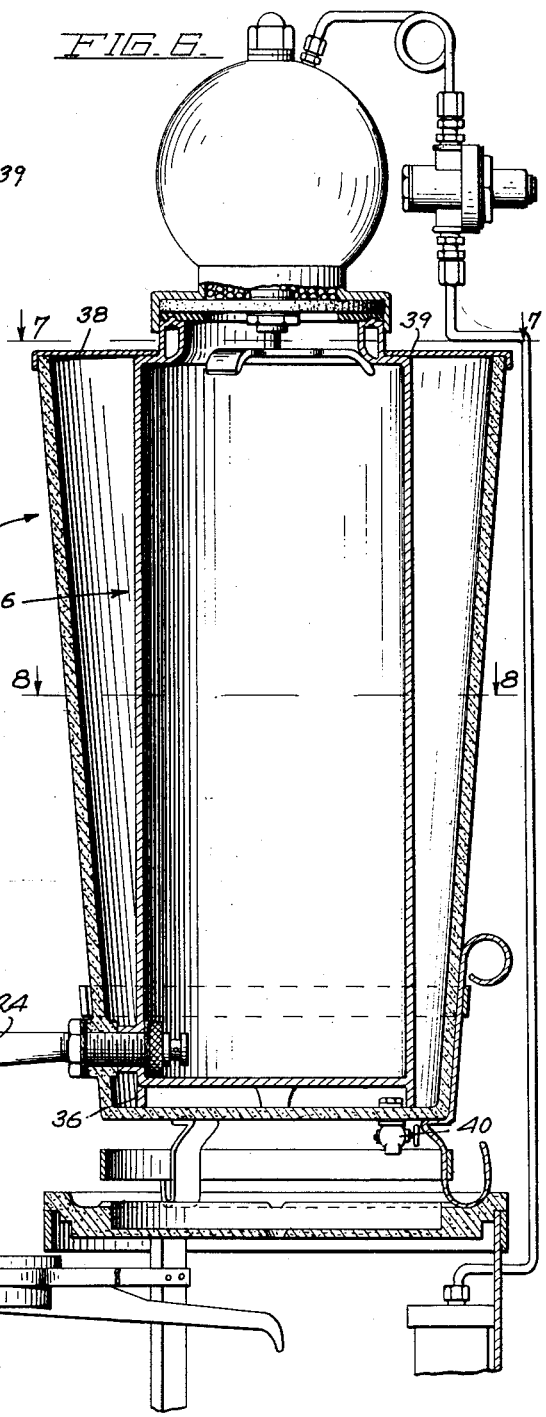
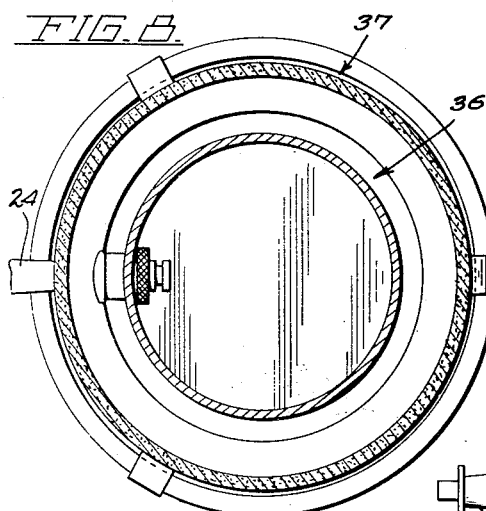
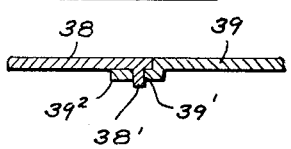

Patented Sept. 26, 1933

1,928,344

UNITED STATES PATENT OFFICE 1,928,344

WATER COOLER AND DISPENSER

Guido J. Wiggenhorn, South Pasadena, Calif.

Application October 14, 1931. Serial No. 568,779

4 Claims. (Cl. 210—103)

My invention relates to a water cooler and dispenser.

In the conventional type of water cooler and dispenser, especially the type that uses an olla, the water is supplied by means of a container such as a large water bottle placed on the top of the olla from which the water flows into the olla and is dispensed from the latter by means of a faucet. The neck of the water bottle is immersed in the water in the olla and as the water is withdrawn through the faucet an equivalent volume of air passes into the water bottle, liberating an equivalent amount of water therethrough until the water level in the olla falls below the mouth of the bottle. It is obvious that the cooling effect of the olla cannot be uniform unless there is a constant volume of water therein. The most serious objection, however, to this type of water cooler and dispenser is the fact that the water is contaminated by the germs and bacteria introduced by the air that must pass into the device in its operation. The effect of filtering and purifying the water in the dispenser or the use of pure spring water is either partially or wholly nullified by the introduction of the bacteria and germ laden air.

It is an object of this invention to provide a water cooler and dispenser in which the water is kept under a predetermined pressure and the water is dispensed without the introduction of air. For this purpose water is conducted from any suitable source of supply and by means of a pressure reducing valve the water is conducted to the olla which is kept completely filled at all times. As the water is dispensed no air is introduced into the apparatus but the water withdrawn is instantly replaced through the reducing valve. I also provide a special construction filter which is easily removed and serviced and which is interposed between the reducing valve and the olla.

With the above and other objects in view, which will appear as the description proceeds, my invention consists in the construction and arrangement of parts hereinafter described and claimed.

In the accompanying drawings which form a part of this specification I have illustrated a preferred embodiment of my invention and in which Fig. 1 is a side elevation of my water cooler and dispenser, parts being shown in section.

Fig. 6 is a vertical central section with parts in elevation of a modified form of my device in which the dispensing water jar is surrounded by an ice jacket.

Fig. 7 is a horizontal section on the line 7—7 of Fig. 6.

Fig. 8 is a horizontal section on the line 8—8 of Fig. 6.

Fig. 9 is a detail view showing the interlocking of the two-part lid of the ice jacket.

Figure 3:
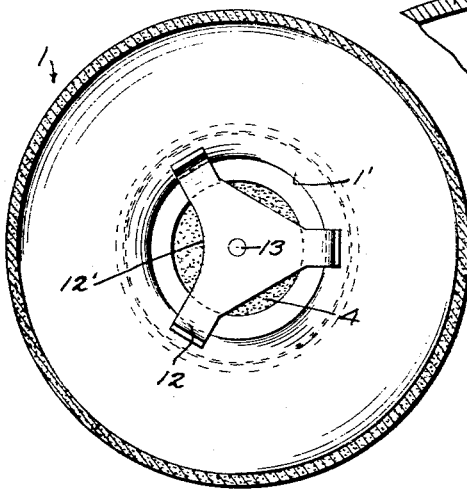
Fig. 3 is a horizontal section looking upwardly on line 3—3 of Fig. 1.
Figure 4:
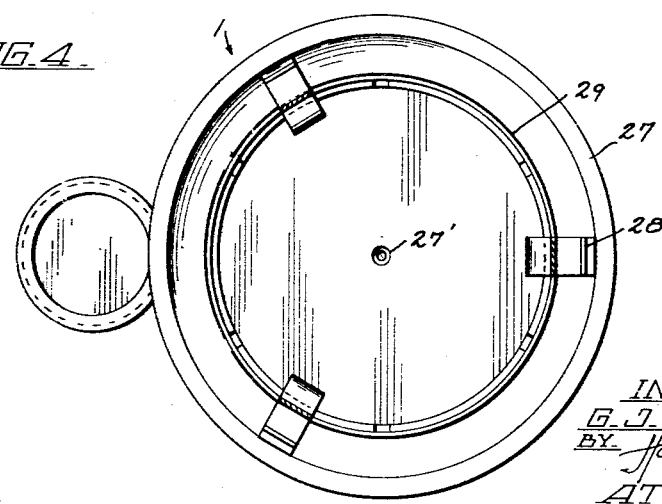
Fig. 4 is a horizontal section on line 4—4 of Fig. 1.

Referring to the drawings, 1 indicates an olla made of burnt but unglazed earthenware of any preferred composition, the walls being of sufficient thickness to withstand the increased pressure, as compared with that of the ordinary olla, to which it is subjected. The top is provided with a flanged mouth 1' preferably having a medium rib 2, an annular rubber gasket 3 is placed on the mouth 1' and a porous stone plate 4 of the same diameter as the rubber gasket is placed on top thereof. A globular filter chamber 5 open at the botom and provided with an annular flange 6 with a depending flange 7 fits closely on the outer marginal face of the porous stone plate 4 and engaging the gasket 3. Integral with the walls of the filter chamber 5 and passing centrally therethrough is a metal tube or sleeve 8, the lower end of which is provided with a shoulder 9 and terminates in an externally threaded portion 10 which passes through a perforation in the porous stone 4. A nut threaded on the end portion 10 of the tube 8 holds the porous plate 4 firmly in position against the shoulder 9. A three-legged spider 12 having a vertical post 13 integral therewith holds the filter chamber 5 securely in position in relation to the olla. The spider 12, as best shown in Fig. 3, is provided with a cut out portion 12' so that one of the legs may be inserted vertically into the mouth of the olla and given a partial rotation to introduce the second and third legs. The vertical post 13 is passed through the tube 8 in which it forms a snug fit and projects slightly above the top of the filter chamber 1 where a nut 14 is screwed on the upper portion of the stem 13' which is threaded to draw the legs of the spider 12 against the base of the mouth 1'. A gasket 15 is interposed between the nut 14 and the filter chamber 5 to make it fluid tight. A screen 16 in the upper portion of the filter chamber 1 provides a water inlet chamber 17 and confines the filtering material 18 which may be a high grade of charcoal between the water chamber 17 and the porous plate 4.

The water is supplied to the olla by means of a water pipe 19 connected to any source of water under considerable pressure. The water passes firs through a water softening chamber 20, thence through pipe 21 to a special reducing valve 22. The particular construction of the reducing valve 22 is not shown for the reason that such valves are well known and any suitable or preferred type may be used so that the pressure will be reduced to a predetermined degree, say 5 lbs. when the water leaves the reducing valve 22 and enters the pipe 23 which leads to the water inlet chamber 17 in the filter chamber 5. Water is drawn through the faucet 24 of any suitable construction, but in view of the pressure in the olla it is desirable to have a reduced port 25 in the passage leading from the olla, so that the water will not rush out with excessive force.

The olla 1 is supported on any suitable frame 26 provided at the top with a water collection plate 27 on which rests the legs 28 of a basket 29 encircling the lower portion of the olla 1. The water collection plate 27 is provided with a central port 27' from which the water drips into a waste water receptacle 30. 31 is a bracket fastened to the frame 26 for the reception of a cup or vessel to receive water from the faucet 24.

Operation

The water under pressure passes from pipe 19 through the water softening device 20, thence to the pressure reducing valve 22 till the pressure is reduced to the desired amount, a pressure of 5 lbs. has been found satisfactory, and thence to the water inlet chamber 17, it percolates through the filtering material 18 in the filter chamber 5, the porous stone 4, into the olla 1. The olla is thus kept constantly full of water at a predetermined pressure, insuring a constant seepage through the porous walls of the olla, which water, by its evaporation, keeps the water within the olla cool. It should be noted also that the olla is exposed at the bottom and on the sides and top to the air, thus presenting a maximum surface to cooling. The olla as shown is preferably the shape with a downward taper and any excess of seepage water will drip into the pan 27, thence into the waste water receptacle 30.

The water softening device 20 may be dispensed with if desired, but if it is used it will require servicing at long intervals only. However, it is desirable to have some filtering means before the water enters the reducing valve 22 in order that no grains of sand or other material may interfere with the proper functioning of the delicate mechanism of the reducing valve 22.

Figure 1:
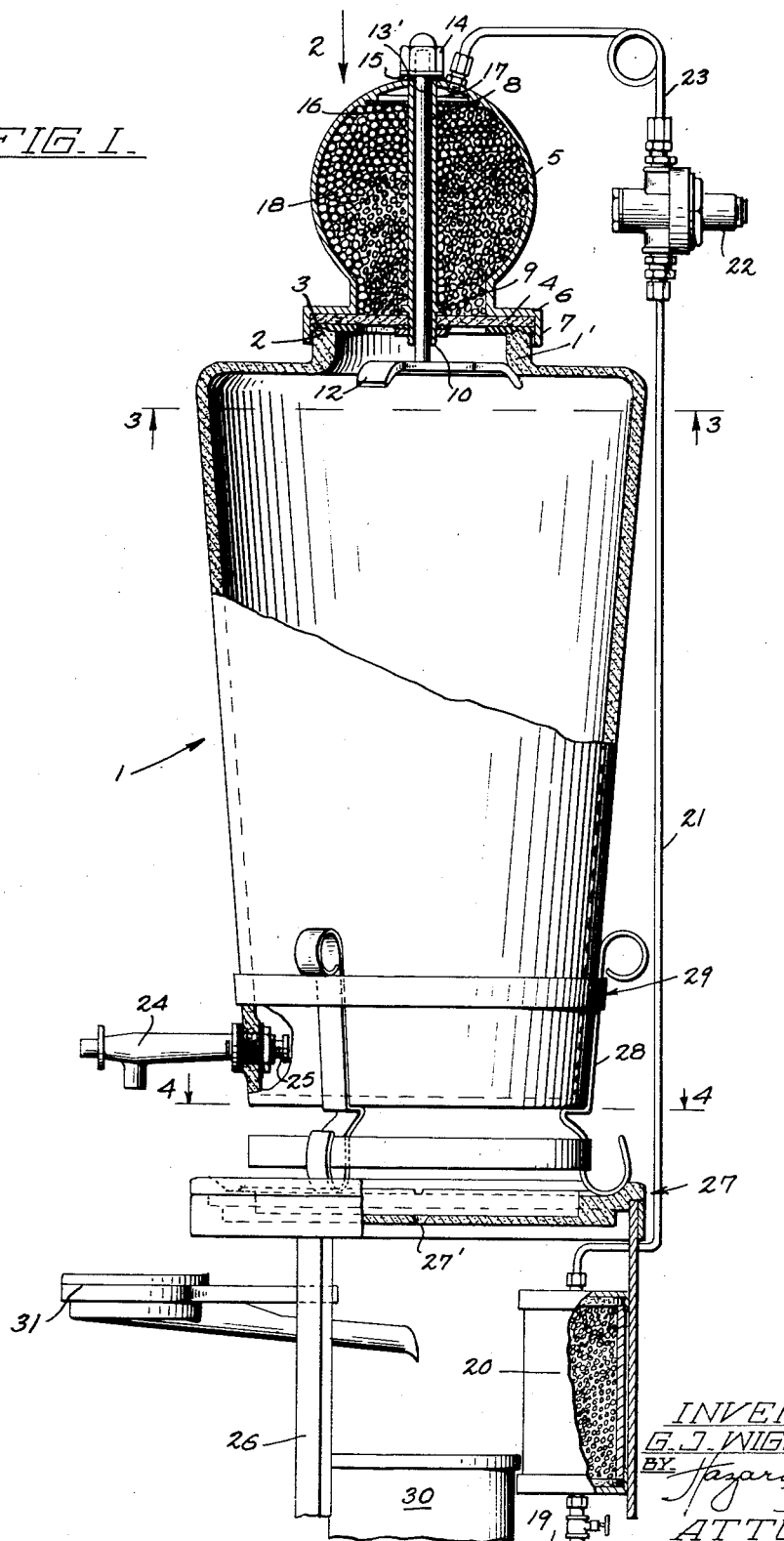
Figure 2:
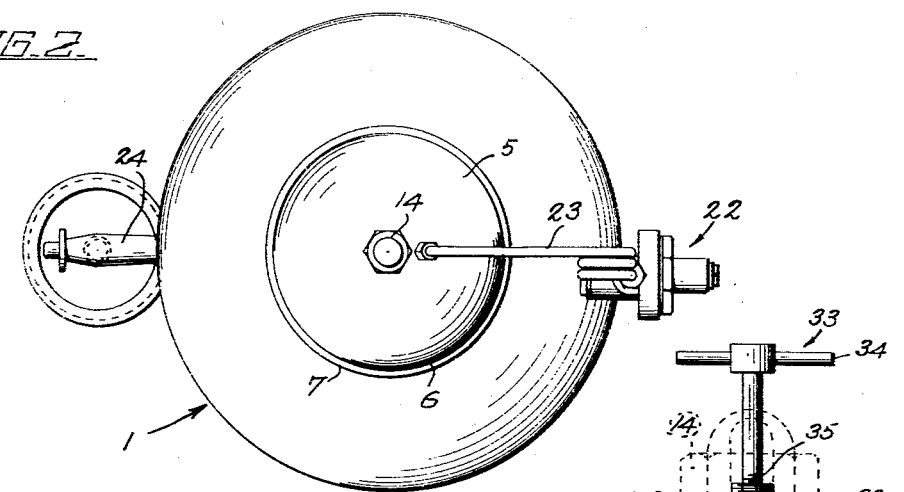
Fig. 2 is a top plan view thereof.
Figure 5:
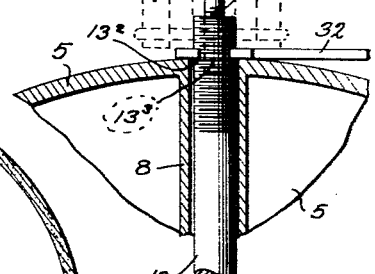
Fig. 5 is a detail view in vertical section of the top of the filter chamber showing the tools used in servicing the water cooler.

The filtering chamber 5 will require servicing at stated intervals and attention is directed to the ease with which the same may be removed and new filtering material 18 and a new porous stone 4 may be substituted. The screw connection leading to the water inlet chamber 17 is disconnected, the nut 14 on the stem 13 is unscrewed for a short distance (see Fig. 5) and a flat wrench 32 is inserted between the nut and the top of the filtering chamber 5 to engage a cut-away portion $13^2$ on the threaded part of the stem 13' of stem 13 for the purpose of temporarily holding the stem from falling while the nut 14 is entirely removed. A holder 33 provided with a handle 34 at its upper end and a screwthreaded stem 35 is now inserted into a tapped bore $13^3$ in the end of stem 13 and rotated so as to fasten the stem and the handle 33 together. The wrench 32 is now removed and the filter chamber 5 is moved upwardly toward the handle 33. This will now give sufficient play for the service man to turn the filter chamber 5 and the spider 12 sideways and remove the latter from the mouth of the olla. The filter chamber is now turned upside down, the spider is removed, the nut 11 is unscrewed on the stem 13, the porous stone plate 4 is now removed and the filtering material 18. New filtering material and a new stone plate 4 may now be inserted, the nut 11 screwed into place, the stem 13 and the spider 12 is now inserted into the guide sleeve 8 and the operation of clamping the filter chamber in position by the use of the wrench 32 and handle 33 is now reversed, as will be understood.

In Figures 6 to 9 inclusive, I have illustrated a modified form of my water cooler and dispenser which in all respects is like the one described in Figures 1 to 5 inclusive, with the exception that I use an impervious water jar 36 in place of the olla 1, which is preferably made of metal and from which water is dispensed by the faucet 24. The water jar 36 is surrounded by an ice jacket or receptacle 37 which is preferably made of unglazed earthenware and in which the water jar 36 is disposed resting on the bottom of the ice receptacle 37 by means of legs 36'. The ice receptacle 37 is open at the top and provided with a two-part lid 38 and 39 which closes the annular space between the jar 36 and the ice receptacle 37. 38 is provided at its ends with depending flanges 38' which fit in a corresponding slot 39' in a depressed flange $39^2$ in the lid 39. The ice receptacle 37 is provided with a drainage cock 40. The ice receptacle 37 is filled with ice as required and the porous nature of the walls of the ice receptacle 37 will preserve the ice cooling effect, although it is not strictly necessary that the receptacle 37 be made of porous material, and the cooling effect may be due to the ice alone.

It will thus be seen that I have provided a water purifier, cooling and dispensing apparatus which is filled completely with water under a constant pressure which avoids the entrance of germ laden air and is serviced with the minimum of effort and which reduces to a minimum the handling by the service man of those parts of the apparatus which come in contact with the water.

Various changes may be made in the construction and arrangement of parts by those skilled in the art without departing from the spirit of my invention as claimed.

I claim:

1. A water cooler and dispenser comprising an olla having an open mouth at the top, a filter chamber removably mounted on said mouth, means engaging the interior wall of the olla and passing through the filter chamber for clamping the filter chamber on to the mouth of the olla, and a conduit connecting a source of water to the filter chamber.

2. A water cooler and dispenser comprising an olla having an open mouth at the top, a filter chamber having a flanged base fitting over the mouth, a porous plate interposed between the mouth and the filter chamber, means engaging the interior wall of the olla and passing through the porous plate and filter chamber for clamping the filter chamber on to the mouth of the olla, and a conduit connecting a source of water to the olla.

3. A water cooler and dispenser comprising an olla having an open mouth at the top, a filter chamber having a flanged base fitting over the mouth, a porous plate interposed between the mouth and the filter chamber, a spider engaging the interior of the olla and adjacent the mouth thereof, a stem fast to the spider and threaded at the top passing through the filter chamber, a nut engaging the threads of the stem to clamp the filter chamber in position on to the mouth of the olla, and a conduit connecting a source of water to said filter chamber.

4. A water cooler and dispenser comprising an olla having an open mouth at the top, a filter chamber having a flanged base fitting over the mouth, a porous plate interposed between the mouth and the filter chamber, a guide sleeve fast to the filter chamber and passing from the top thereof vertically downward through the porous plate, a spider engaging the interior of the olla and provided with a vertical stem passing through the guide sleeve and projecting through the top of the filter chamber, a nut engaging the upper end of the stem for clamping the filter chamber in position on the mouth of the olla, and a conduit connecting a source of water to the filter chamber.

GUIDO J. WIGGENHORN.